(12) United States Patent
Melcher et al.

(10) Patent No.: US 10,703,253 B2
(45) Date of Patent: Jul. 7, 2020

(54) VEHICLE WINDOW WITH LIGHT GUIDE BODY FOR A SENSOR

(71) Applicant: SAINT-GOBAIN GLASS FRANCE, Courbevoie (FR)

(72) Inventors: Martin Melcher, Mountain View, CA (US); Li-Ya Yeh, Geilenkirchen (DE); Martin Arndt, Aachen (DE); Christian Effertz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/349,550

(22) PCT Filed: Nov. 9, 2017

(86) PCT No.: PCT/EP2017/078750
§ 371 (c)(1),
(2) Date: May 13, 2019

(87) PCT Pub. No.: WO2018/087223
PCT Pub. Date: May 17, 2018

(65) Prior Publication Data
US 2019/0263315 A1  Aug. 29, 2019

(30) Foreign Application Priority Data

Nov. 14, 2016  (EP) ..................... 16198566

(51) Int. Cl.
*B60Q 1/00* (2006.01)
*B23K 26/21* (2014.01)
(Continued)

(52) U.S. Cl.
CPC ............ *B60Q 1/0011* (2013.01); *B23K 26/21* (2015.10); *B60J 1/12* (2013.01); *B60R 11/04* (2013.01);
(Continued)

(58) Field of Classification Search
CPC . B60Q 1/011; B23K 26/21; B60J 1/12; B60R 11/04; B60R 2011/0026;
(Continued)

(56) References Cited

U.S. PATENT DOCUMENTS 7,457,040 B2   11/2008 Amitai et al.
7,894,054 B2 *  2/2011 Backes .................... G01J 1/04
                                                    356/239.8
(Continued)

FOREIGN PATENT DOCUMENTS

DE        102 19 393 A1    11/2003
DE    10 2006 010672 A1     9/2007
(Continued)

OTHER PUBLICATIONS

International Search Report as issued in International Patent Application No. PCT/EP2017/078750, dated Feb. 7, 2019.

*Primary Examiner* — Mary Ellen Bowman
(74) *Attorney, Agent, or Firm* — Pillsbury Winthrop Shaw Pittman LLP

(57) ABSTRACT

A vehicle window for separating a vehicle interior from outer surroundings, includes glass pane with a light guide body made of glass on a region of the interior-side surface of the glass pane, wherein the surface of the light guide body facing the glass pane and the surface facing away from the glass pane enclose a wedge angle such that the thickness of the light guide body decreases in the direction from a lower edge to an upper edge of the glass pane, wherein the light guide body is secured to the interior-side surface of the glass pane by means of laser welding.

16 Claims, 3 Drawing Sheets

Figure 1:
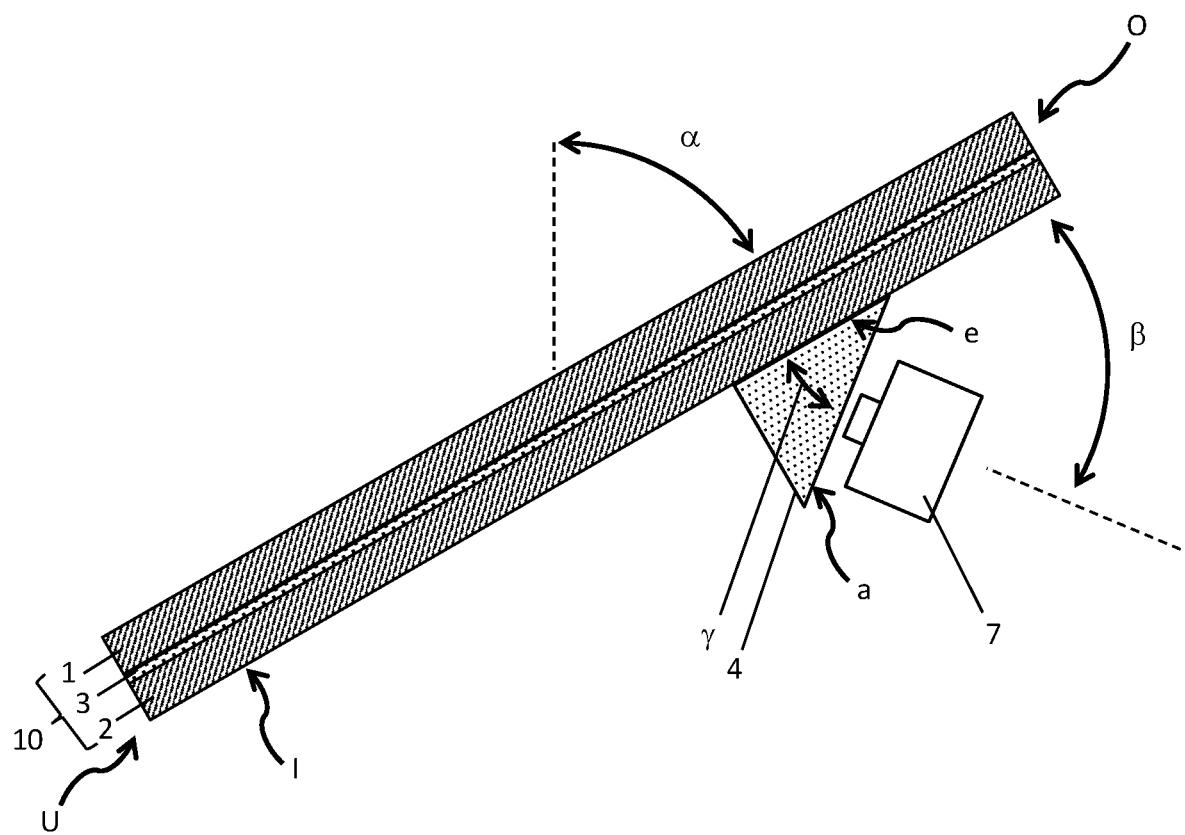

(51) Int. Cl.
    *B60J 1/12* (2006.01)
    *F21V 8/00* (2006.01)
    *B60R 11/04* (2006.01)
    *B60R 11/00* (2006.01)

(52) U.S. Cl.
    CPC ......... *G02B 6/0018* (2013.01); *G02B 6/0028* (2013.01); *G02B 6/0031* (2013.01); *G02B 6/0095* (2013.01); *B60R 2011/0026* (2013.01)

(58) Field of Classification Search
    CPC .. G02B 6/0018; G02B 6/0028; G02B 6/0031; G02B 6/0095
    See application file for complete search history.

(56) References Cited

U.S. PATENT DOCUMENTS

| | | | | |
|---|---|---|---|---|
| 9,525,808 | B2* | 12/2016 | Eickhoff | H04N 5/2254 |
| 2008/0284850 | A1* | 11/2008 | Blaesing | B60S 1/0822 |
| | | | | 348/148 |

FOREIGN PATENT DOCUMENTS

| | | |
|---|---|---|
| DE | 10 2008 020954 A1 | 10/2009 |
| EP | 2 181 023 A1 | 5/2010 |
| EP | 2 390 141 A1 | 11/2011 |
| RU | 39209 U1 | 7/2004 |
| RU | 2324960 C2 | 5/2008 |
| WO | WO 00/55010 A1 | 9/2000 |
| WO | WO 2009/024597 A1 | 2/2009 |
| WO | WO 2011/065104 A1 | 6/2011 |

* cited by examiner

VEHICLE WINDOW WITH LIGHT GUIDE BODY FOR A SENSOR

CROSS-REFERENCE TO RELATED APPLICATIONS

This application is the U.S. National Stage of PCT/EP2017/078750, filed Nov. 9, 2017, which in turn claims priority to European patent application number 16198566.8 filed Nov. 14, 2016. The content of these applications are incorporated herein by reference in their entireties.

The invention relates to a vehicle window, a method for production thereof, and use thereof.

Modern vehicles are equipped with an increasing number of optical sensors whose signals are used to assist the driver. Examples of such sensors are cameras such as lane cameras or night vision cameras, rain sensors, light sensors, or distance meters. Forward-oriented sensors are frequently secured on the interior-side surface of the windshield, typically centrally in the vicinity of the upper edge. The sensors are obscured by an opaque masking print on the windshield. For this, the customary, peripheral, frame-like masking print, which serves primarily as UV protection for the assembly adhesive of the windshield, is significantly enlarged in the direction of the center of the pane in the region of the sensors.

Conventional sensors, in particular, cameras, are mounted on the windshield such that their detection direction runs horizontally. Since the windshield is installed in the vehicle greatly inclined, for example, at an installation angle of 60° relative to the vertical, the detection direction of the sensor encloses a very acute angle of approx 30° with the windshield. This yields a relatively large, substantially trapezoidal so-called "sensor region" (or "sensor window") of the windshield. The sensor region is that region of the windshield by which radiation passing through is detected by the sensor. The sensor region of the windshield is, thus, the region that lies in the detection beam path of the sensor.

The more sensors to be secured on the pane, the more area of the windshield is occupied by the total of the sensor regions, and the larger the masking print intended to obscure the sensors has to be. However, this reduces the total light transmittance through the pane and it frequently is less attractive aesthetically.

The sensor region of the windshield can be reduced by selecting the angle between the sensor and the windshield as large as possible, ideally 90°. However, in order for the detection direction of the sensor to remain oriented horizontally forward, the detection beam path must be accordingly deflected in or behind the pane. Light guide bodies are known that are mounted between the sensor and the pane and, due to their refractive index, guide the radiation horizontally passing through the pane into the sensor. EP 2181023 A1 discloses such a light guide body made of silicone that is mounted on a windshield. A light guide body made of glass is known, for example, from US 2008/0284850 A1. There, the light guide body is connected to the windshield, probably glued, via a plastic film with heating structures.

DE102008020954A1 also discloses a windshield with a light guide body made of glass, which is glued onto the interior-side surface.

Glued-on light guide bodies are not particularly stable and are easily unintentionally detached from the pane, for example, during transport. Consequently, typically, not until the time of installation of the pane in the vehicle are they installed together with the sensor. Since the sensor must have an orientation precisely attuned to the pane type, this sort of installation is complicated.

The object of the present invention is to provide a further improved vehicle window having a light guide body, wherein, in particular, the connection between the vehicle window and the light guide body is improved.

The object of the present invention is accomplished according to the invention by a vehicle window in accordance with claim 1. Preferred embodiments are apparent from the dependent claims.

The vehicle window according to the invention is provided for separating a vehicle interior from outer surroundings. The vehicle window is thus a window pane that is inserted or intended for insertion into a window opening of the vehicle body. The vehicle window according to the invention is, in particular, a windshield of a motor vehicle. The vehicle window comprises at least one glass pane. That surface of the glass pane or vehicle window that faces the outer surroundings of the vehicle in the installed position is referred to as the "exterior-side surface". That surface that faces the interior of the vehicle in the installed position is referred as the "interior-side surface".

The vehicle window is, in particular, intended and suitable for securing a sensor on its interior-side surface. For this, the interior-side surface of the glass pane can be equipped with suitable holders, for example, with a bracket or housing. The region of the vehicle window that is arranged in the detection beam path of the sensor or is intended for that is referred to as the "sensor region" or "sensor window". Radiation that passes through the vehicle window in the sensor region is detected by the sensor.

The vehicle window according to the invention also includes a light guide body that is arranged on a region of the interior-side surface of the glass pane. Said region of the glass pane corresponds at least to the sensor region, but can also be larger. The size of said region of the glass pane is at least 4 cm$^2$, for example, from 10 cm$^2$ to 100 cm$^2$, preferably from 25 cm$^2$ to 50 cm$^2$.

The light guide body contains or is made of glass. The light guide body is intended to deflect, in particular to refract away from the pane, radiation that passes through the vehicle window from the outside and is to be detected by the sensor, such that the working angle of the sensor is enlarged. Since the sectional area of the glass pane through the detection cone of the sensor yields the sensor region, a larger working angle results in a smaller sensor region. The region of the vehicle window that is used for detection and is usually surrounded by an opaque masking print to conceal the sensors positioned therebehind can thus be reduced, improving the total light transmittance and the aesthetic appearance of the vehicle window. The inventors found that with a tilt of the sensor of 5° relative to the horizontal, a size reduction of the sensor region of more than 50% can be obtained.

The light guide body has two surfaces through which the radiation passes on the way from the glass pane to the sensor: a first surface facing the glass pane, through which the radiation enters the light guide body, and a second surface facing away from the glass pane, through which the radiation exits the light guide body. Consequently, the first surface can be referred to as the "entry surface"; and the second surface, the "exit surface". The light guide body is connected to the glass pane via the entry surface facing the glass pane, whereas the sensor is oriented toward the exit surface facing away from the glass pane.

The entry surface and the exit surface of the light guide body must together enclose an angle greater than 0° in order to achieve the desired deflection of the detection beam path. In the context of the invention, this angle is referred to as a "wedge angle". The light guide body is arranged such that the thickness of the light guide body decreases in the direction from the lower edge to the upper edge of the glass pane. The upper edge is that side edge that is intended, in the installation position, to point upward toward the vehicle roof (roof edge). The lower edge is that side edge that is intended, in the installation position, to point downward toward the engine compartment (engine edge).

Apart from the wedge angle, there are no further requirements for the geometric design of the light guide body. The light guide body can have a simple wedge shape with a triangular cross section, but also a trapezoidal or even a higher polygonal cross-section.

The larger the wedge angle, the stronger the deflection of the radiation and the more pronounced the inventive effect. However, the dimension of the light guide body between the glass pane in the sensor also increases with the wedge angle. Consequently, the space requirement imposes limits on the size of the wedge angle. The wedge angle should be at least 2°, preferably at least 10°, in order to effect an advantageous deflection of the radiation. The wedge angle is, for example, from 2° to 30°, preferably from 10° to 25°.

According to the invention, the light guide body is secured to the interior-side surface of the glass pane by means of laser welding. This ensures a very stable connection between the glass pane and the light guide body. The light guide body can be secured to the glass pane at an early stage and transported together with it. At the time of installation of the pane in the vehicle, all that remains to be done is the securing of the sensor behind the light guide body. The gluing-on of the light guide body at the site of use and the complicated adjustment of the camera position are eliminated, thus facilitating the installation of the pane with the sensor in the vehicle.

The glass pane according to the invention is understood to be a pane, in particular a window pane, that is made predominantly of glass. The glass pane can be a single monolithic pane made of glass; however, the term also includes panes that include other materials besides glass, such as printed or glued glass or glass laminates.

In a preferred embodiment, the glass pane is such a glass laminate, namely, a composite glass, as is customary in the vehicle sector, in particular for windshields. The composite glass comprises an outer pane made of glass and an inner pane made of glass that are joined to one another via a thermoplastic intermediate layer. The term "inner pane" refers to that pane that is intended to face the interior of the vehicle in the installed position. The term "outer pane" refers to that pane that is intended to face the outer surroundings of the vehicle in the installed position. If the glass pane is not a monolithic pane, but, instead, a glass laminate, significant refractive index differences should occur within the glass laminate. This is ensured with typical vehicle composite glasses. The maximum difference in the refractive indices of the components of the glass laminate in the beam path of the detector should be, at most, 0.05.

In an advantageous embodiment, the refractive index of the light guide body corresponds substantially to the refractive index of the glass pane. In the context of the invention, this means that the difference in the refractive indices of the light guide body and the glass pane or their individual components in the case of a glass laminate) must not exceed 0.05. Matching of the refractive indices is, to be sure, not mandatory for the radiation deflecting effect of the light guide body according to the invention; however, a chromatic aberration can, in particular, be avoided in this manner. A major advantage of laser welding compared to other securing methods, such as via an adhesive, consists in that refractive index differences can be avoided. In the context of the invention, the refractive index is measured at a wavelength of 550 nm.

In a preferred embodiment, the light guide body contains or is made of soda lime glass, borosilicate glass, aluminosilicate glass, or quartz glass, particularly preferably soda lime glass. For laser welding, it is particularly advantageous for the light guide body to contain the same type of glass as the glass pane.

The glass pane typically contains soda lime glass, borosilicate glass, aluminosilicate glass, or quartz glass, particularly preferably soda lime glass, as is customary for window panes. Soda lime glass typically has refractive indices from 1.5 to 1.55, in particular 1.52. However, in principle, other types of glass can also be used, such as borosilicate glass (refractive index, for example, 1.47), aluminosilicate glass (refractive index, for example, 1.5), or quartz glass (refractive index, for example, 1.46).

If the glass pane is a composite pane, the thermoplastic intermediate layer preferably contains ethylene vinyl acetate (EVA), polyvinyl butyral (PVB), or polyurethane (PU) or mixtures or copolymers or derivatives thereof, particularly preferably PVB. The intermediate layer can be formed from a film having a thickness of preferably 0.2 mm to 2 mm, particularly preferably from 0.3 mm to 1 mm, for example, 0.38 mm or 0.76 mm. The intermediate layer can also be formed from a plurality of superimposed films or formed from layers of different materials, as is, for example, the case for films with noise-reducing properties. The thickness of the outer pane and of the inner pane is typically from 0.5 mm to 5 mm, preferably from 1 mm to 3 mm.

The entry surface of the light guide body facing the glass pane and the region of the interior-side surface of the glass pane on which the light guide body is secured are advantageously parallel such that an optimal connection is ensured. Since vehicle windows are typically curved, the entry surface of the light guide body preferably also has a curvature. The curvature of the entry surface of the light guide body is complementary to the curvature of the region of the interior-side surface of the glass pane on which the light guide body is mounted. The term "complementary curvatures" means curvatures of substantially identical radius of curvature and opposite convexity/concavity. Since the interior-side surface of vehicle windows are typically curved concavely, the entry side surface of the light guide body is preferably curved convexly.

In an advantageous embodiment, the exit surface of the light guide body facing away from the glass pane is implemented as an optical lens. The exit surface thus has a convex or concave curvature. In particular, the exit surface is curved convexly in order to effect focusing of radiation passing through the light guide body. The advantage consists in that the typically present optical system of the sensor can be configured in a simplified manner since one of the lenses is integrated directly into the light guide body.

Laser welding is a technique in which a laser beam is focused on the interface of the two workpieces to be joined, as a result of which it is, so to speak, locally fused, resulting in a durably stable connection. In a preferred embodiment, it is not the entire interface between the light guide body and the glass pane that is treated with the laser, but, rather, only a circumferential weld is produced around the edge region of the interface, preferably along the side edges of the interface. This is sufficient for the stable connection and simplifies the welding operation. In addition, the optical quality of the glass elements in the detection beam path is retained. Preferably, the entry surface of the light guide body is thus positioned with its full surface against the region of the interior-side surface of the glass pane and is connected by means of a circumferential peripheral weld to the interior-side surface.

An adhesion promoter, in particular glass frits, can be arranged along the weld between the glass pane and the light guide body. This facilitates the connection of the two workpieces and simplifies the welding operation.

A further aspect of the invention is an arrangement comprising a vehicle window according to the invention and an optical sensor mounted thereon, which is secured to the interior-side surface and is oriented toward the light guide body, in particular the exit surface of the light guide body. The detection beam path of the sensor thus runs through the light guide body. The optical sensor is preferably the sensor of an optical camera, in other words, a camera with sensitivity in the visible spectral range. The sensor can, for example, be a CCD or CMOS sensor. The camera can, for example, be a lane camera or a camera for an augmented reality head-up display.

In a conventional vehicle composite pane, which typically consists of two panes made of soda lime glass and a PVB intermediate layer, no significant changes of the refractive index occur within the composite pane. A beam passing horizontally through the pane is offset in parallel, but remains horizontal after passage through the pane such that the sensor must be aligned parallel to the horizontal in order to detect the beam. By means of the light guide body according to the invention, the sensor can be arranged at a greater angle relative to the vehicle window, as result of which the sensor region of the vehicle window becomes smaller. This effect can be understood based on simple geometric considerations: the sensor region corresponds to the sectionial area through the detection cone of the sensor at the position of the vehicle window. This area is minimal at an angle of 90° and increases with a decreasing angle. Typically, windshields are arranged with an installation angle of approx 60° relative to the vertical. In the case of curved panes, the tangential plane in the geometric center of the pane is used for determining the installation angle. A conventional forward-oriented sensor with horizontal orientation thus encloses an angle of approximately 30° relative to the windshield. Through the deflection of the detection beam path by means of the light guide body according to the invention, the angle can be advantageously enlarged. Thus, the sensor region occupies less area of the vehicle window; consequently, the masking print for concealing the sensor can be made smaller. In particular, when a plurality of sensors are adjacent each other, the invention is particularly advantageous since an excessively large masking print for concealing the totality of the the sensor regions can be avoided. In a preferred embodiment, the sensor is arranged at an angle from 45° to 90° relative to the glass pane. For the exact determination, even in the case of curved panes, the angle between the central detection direction of the sensor (center of the detection cone) and the tangential plane in the geometric center of the sensor region on the interior-side surface of the inner pane must be used.

The glass pane can be clear and colourless, but also tinted, frosted, or coloured. The total transmittance through the glass pane is, in a preferred embodiment, greater than 70%, in particular when it is a windshield. The term "total transmittance" is based on the process for testing the light permeability of motor vehicle windows specified by ECE-R 43, Annex 3, § 9.1. The glass pane can be non-tempered, partially tempered, or tempered.

The vehicle window is preferably curved in one or a plurality of spatial directions, as is customary for motor vehicle windows, with typical radii of curvature in the range from approx 10 cm to approx. 40 m. The vehicle window can, however, also be flat, for example, when it is provided as a pane for buses, trains, or tractors.

The vehicle window preferably has a masking print. Masking prints are customary for vehicle windows, outside the central field of vision, to conceal attachment parts or to protect the adhesive with which the vehicle window is joined to the car body against UV radiation. The masking print typically consists of a black or dark enamel applied and fired in the screen printing method. Preferably, the masking print frames the sensor region of the vehicle window circumferentially, in order to conceal the sensor positioned therebehind.

The invention also includes a method for producing a vehicle composite pane, wherein (a) a light guide body made of glass is arranged on a region of an interior-side surface of a glass pane, wherein the surface facing the glass pane and the surface of the light guide body facing away from the glass pane enclose a wedge angle and the thickness of the light guide body decreases in the direction from a lower edge to an upper edge of the glass pane, (b) the light guide body is secured on the glass pane by means of laser welding.

In the laser welding, the radiation of a laser is focused on the interface between the glass pane and the light guide body, by means of which the two glass surfaces are durably stably joined to one another. The laser radiation is moved preferably circumferentially along the side edges of the interface, or in the edge region of the interface in the vicinity of and substantially parallel to the side edges to produce a circumferential, peripheral weld. The laser radiation can pass through the glass pane, through the light guide body, or even be aimed laterally at interface.

The laser welding can be facilitated by preheating the glass pane to, for example, 200° C. to 300° C. The method according to the invention is, however, preferably carried out at room temperature. For one thing, this eliminates the time-consuming and energy-intensive preheating. For another, with a finished, curved, and possibly laminated vehicle window, there would be, through heating, the risk of optical imperfections or delamination. Welding at room temperature can be simplified by suitable adhesion promoters.

In an advantageous embodiment, before the laser welding, such an adhesion promoter is arranged between the light guide body and the glass pane at least in the region of the weld to be produced. Glass frits, which promote the bonding of the two glass surfaces, are particularly suitable as adhesion promoters.

The glass frits can be applied purely in powder form. However, a paste that can include binders, solvents, dispersants, surfactants, or other components besides the glass frits, is simpler to handle. Such a paste can also be applied well by automation, for example, by screen printing, doctoring, or extrusion using a robot-controlled nozzle. Depending on the composition of the paste, preheating to eliminate organic components can be advantageous or necessary.

For the laser welding, a laser with radiation in the infrared range is preferably used. The wavelength is greater than 800 nm, for example, from 800 nm to 20 µm. Particularly good results are achieved with an Nd:YAG laser (1064 nm). Alternatively, diode lasers are particularly suitable.

The laser can be operated in continuous wave or pulsed mode. With pulsed operation, higher power densities can be achieved, which is advantageous for laser welding.

The output power of the laser is preferably from 20 W to 1 kW, for example, from 50 W to 500 W. With such powers, a good weld joint can be produced. With this, particularly good results are achieved.

Before welding, the light guide body can be processed, for example, by grinding. Thus, for example, the exit surface can be ground to form a lens, or the entry surface can be provided with a curvature to match it to the glass pane.

The invention further includes the use of a vehicle window according to the invention as a windshield of a vehicle, preferably of a motor vehicle. An optical sensor that is oriented toward the surface of the light guide body facing away from the vehicle window is preferably secured on the interior-side surface of the glass pane. The sensor is preferably a CCD or CMOS chip of an optical camera, i.e., a camera sensitive in the visible spectral range, which is, for example a lane camera or a camera for an augmented reality head-up display.

In the following, the invention is explained in detail with reference to drawings and exemplary embodiments. The drawings are a schematic representation and not to scale. The drawings in no way restrict the invention.

Figure 2:
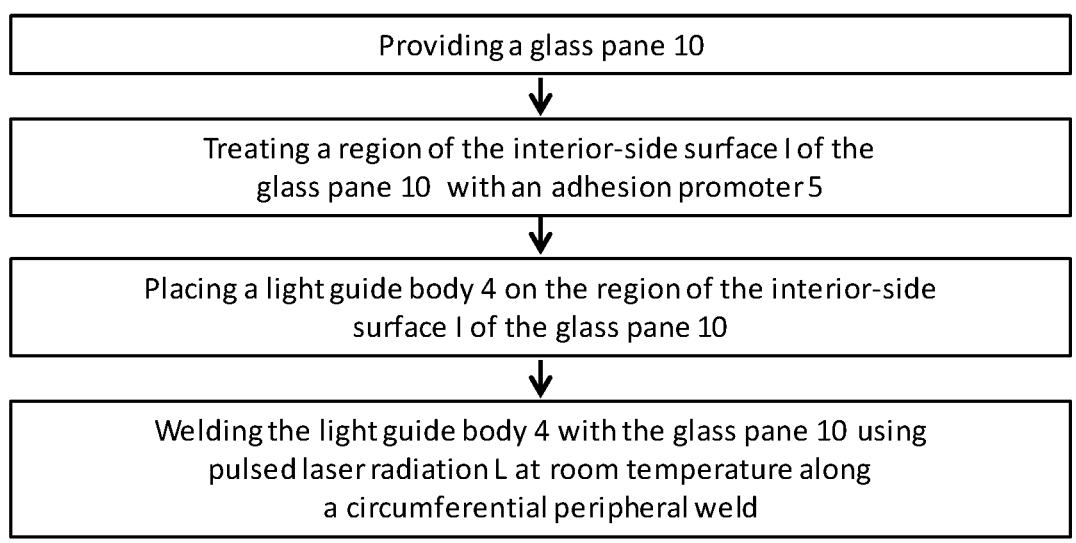
Figure 3:
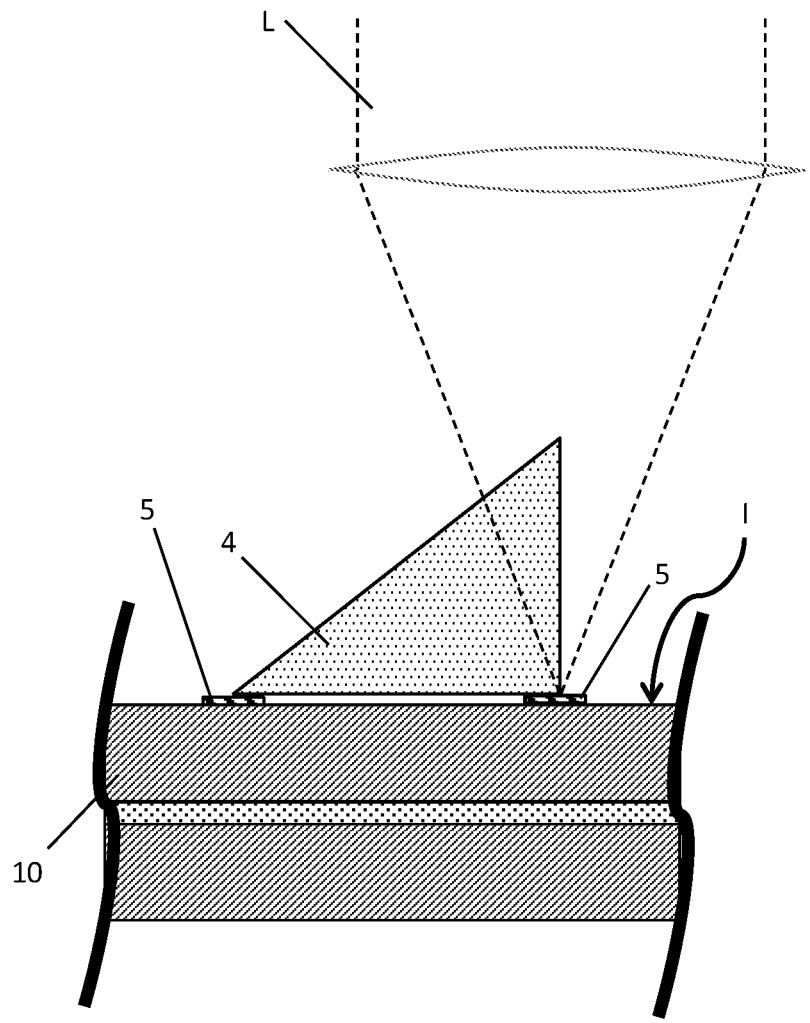

They depict:

FIG. 1 a cross-section through an embodiment of the vehicle window according to the invention, FIG. 2 a flowchart of an embodiment of the method according to the invention, and FIG. 3 a cross-section through the vehicle window during the mounting of the light guide body 4.

FIG. 1 depicts a cross-section of a vehicle window according to the invention. The vehicle window is intended as a windshield of a passenger car and comprises a glass pane 10, which is implemented as composite glass. The composite glass pane consists of an outer pane 1 and an inner pane 2 that are areally joined to one another by means of a thermoplastic intermediate layer 3. In the installation position, the inner pane 2 faces the interior of the vehicle. In the installation position, the outer pane 1 faces the outer surroundings. The outer pane 1 and the inner pane 2 are made of soda lime glass and have, for example, a thickness of 2.1 mm. The intermediate layer 3 is formed from a 0.76-mm-thick PVB film. The glass pane 10 has an upper edge O and a lower edge U. In the installation position, the upper edge O points upward toward the vehicle roof; in the installation position, the lower edge U points downward toward the engine compartment.

A sensor 7 is arranged on the interior-side surface I of the glass pane 10 or the inner pane 2. The sensor 7 is, for example, a lane camera. The detection direction of the sensor 7 is forward-oriented outside the vehicle window approx horizontally. Radiation that passes horizontally through the glass pane 10 in a so-called "sensor region" is detected by the camera.

The vehicle window is, as is customary for windshields, installed in the vehicle at an installation angle α of 60° relative to the vertical. In a prior art vehicle window, the sensor 7 consequently would have had to be oriented horizontally, which would result in an acute angle β of approx 30° relative to the interior-side surface I.

In the vehicle window according to the invention, a light guide body 4 that deflects the radiation to be detected is arranged on the interior-side surface I of the glass pane 10 in the sensor region. The light guide body 4 has a surface e (entry surface) facing the glass pane 10, via which the radiation enters it, and a surface a (exit surface) facing away from the glass pane 10, via which the radiation leaves it. The light guide body 4 is connected to the glass pane 10 via its entry surface e; the sensor 7 is oriented toward the exit surface a of the light guide body 4. The entry surface e and the exit surface a are arranged with a wedge angle γ of, for example, 25° relative to one another. The light guide body 4 acts, so to speak, as an optical prism. The radiation passing horizontally from the outside through the glass pane 10 is refracted by the light guide body 4, and the sensor 7 can be arranged at a less acute angle β of, for example, 60° relative to the interior-side surface I of the glass pane 10. As a result, the space requirement of the sensor area on the vehicle window can be advantageously reduced. The sensor region results, in fact, from the sectional area resulting from the sectioning of the glass pane 10 by the detection cone of the sensor 7. The size of this sectional area is minimal at an angle β of 90° and increases with the decreasing value of β.

In the embodiment depicted, the light guide body 4 is implemented as a simple prism with a triangular cross-section. Other shapes are, however, also conceivable; for example, a prism with a trapezoidal base surface, so long as the wedge angle γ is present between the entry surface e and the exit surface a. The light guide body 4 is arranged on the glass pane 10 such that its thickness decreases in the direction from the lower edge U for the upper edge O.

The light guide body 4 is made of soda lime glass, is thus optimally matched to the glass pane 10 with regard to its optical and mechanical properties. It is connected to the glass pane 10 by means of a circumferential, peripheral laser weld.

The glass pane 10 is depicted planar in the drawings for the sake of simplicity. In reality, however, windshields typically have a curvature. The interior-side surface I of the glass pane 10 in the sensor region and the entry surface e of the light guide body are matched to each other and implemented complementary to one another such that the surfaces to be joined are parallel to one another and can be brought into formfitting contact with one another.

The surface a of the light guide body can optionally be ground to form a lens such that the light guide body is simultaneously part of the optical system of the sensor 7.

FIG. 2 depicts a flowchart of an exemplary embodiment of the method according to the invention for producing a vehicle composite pane. First, a glass pane 10 is provided. The glass pane 10 can be a composite glass pane made of two single panes of soda lime glass that are bonded to one another via a PVB intermediate layer. Such a composite glass pane is produced by standard methods under the action of heat, vacuum, and/or pressure, for example, with autoclave methods, vacuum bag or vacuum ring methods, or calendering methods. The interior-side surface I of the glass pane 10 is then prepared in advance, by applying an adhesion promoter 5 on the sensor region. The adhesion promoter 5 can be a paste with glass frits. It suffices to apply the adhesion promoter 5 in a frame-like manner along the planned weld. Then, the light guide body 4 is placed on the sensor region with the adhesion promoter 5. For the subsequent welding, infrared laser radiation L is focused on the entry surface 2 of the light guide element 4, which can be done through the glass pane 10 or through the light guide element 4. The laser radiation L is then moved along the side edge of the entry surface e of the light guide element. The glass pane 10 and the light guide element 4 are thus welded to one another with the assistance of the adhesion promoter 5.

FIG. 3 depicts a cross-section of the vehicle window during laser welding. An adhesion promoter 5 is arranged between the glass pane 10 and the light guide body 4 in the edge region. The adhesion promoter 5 is a paste containing glass frits. The radiation L of a pulsed Nd:YAG laser is focused through the light guide body 4 onto the entry surface e of the light guide body 4. The laser radiation L is then moved along the side edge of the entry surface e such that a circumferential weld is formed with the assistance of the adhesion promoter 5.

EXAMPLE

The effect according to the invention is illustrated by means of a windshield with an installation angle α of 60°. A camera is mounted behind the windshield. Without the light guide body 4 according to the invention, a size of the camera window of the windshield of 40 cm$^2$ and a necessary total area of the black print in the camera region of 190 cm$^2$ are obtained. With a light guide body according to the invention with a wedge angle γ of 25° and optimisation of the installation angle β, the size of the camera window is reduced to 1 cm$^2$ and the necessary total area of the black print to 130 cm$^2$.

LIST OF REFERENCE CHARACTERS

(10) glass pane
(1) outer pane
(2) inner pane
(3) thermoplastic intermediate layer
(4) light guide body
(5) adhesion promoter
(7) sensor
(α) installation angle of the vehicle window 10
(β) installation angle of the sensor/of the camera 7
(γ) wedge angle of the light guide body 4
O upper edge/roof edge of the vehicle window 10
U lower edge/engine edge of the vehicle window 10
I interior-side surface of the vehicle window 10
L laser radiation
e surface of the light guide body 4 facing the vehicle window 10 (entry surface)
a surface of the light guide body 4 facing away from the vehicle window 10 (exit surface)

The invention claimed is:

1. A vehicle window for separating a vehicle interior from outer surroundings, comprising a glass pane with a light guide body made of glass on a region of the interior-side surface of the glass pane,
    wherein a surface of the light guide body facing the glass pane and a surface of the light guide body facing away from the glass pane enclose a wedge angle such that a thickness of the light guide body decreases in a direction from a lower edge to an upper edge of the glass pane,
    wherein the light guide body is secured to the interior-side surface of the glass pane by means of laser welding,
    wherein the surface of the light guide body facing the glass pane is positioned with its full surface against the region of the interior-side surface of the glass pane and is joined to the interior-side surface by means of a circumferential peripheral weld, and wherein along the weld, an adhesion promoter that contains glass frits is arranged between the glass pane and the light guide body.

2. The vehicle window according to claim 1, wherein a refractive index of the light guide body corresponds substantially to a refractive index of the glass pane.

3. The vehicle window according to claim 1, wherein the light guide body contains soda lime glass, borosilicate glass, aluminosilicate glass, or quartz glass.

4. The vehicle window according to claim 1, wherein a curvature of the surface of the light guide body facing the glass pane is complementary to a curvature of the region of the interior-side surface of the glass pane on which the light guide body is mounted.

5. The vehicle window according to claim 1, wherein the wedge angle of the light guide body is at least 2°.

6. The vehicle window according to claim 1, wherein the surface of the light guide body facing away from the glass pane is implemented as a lens.

7. The vehicle window according to claim 1, wherein an optical sensor, which is oriented toward the surface of the light guide body facing away from the glass pane, is secured on the glass pane.

8. A method for producing a vehicle window, comprising:
    (a) arranging a light guide body made of glass on a region of an interior-side surface of a glass pane wherein a surface of the light guide body facing the glass pane and a surface of the light guide body facing away from the glass pane enclose a wedge angle and a thickness of the light guide body decreases in a direction from a lower edge to an upper edge of the glass pane, and
    (b) securing the light guide body on the glass pane by means of laser welding,
    wherein glass frits are arranged between the light guide body and the glass pane.

9. The method according to claim 8, wherein in step (b) laser radiation is moved circumferentially along or parallel to a side edge of the surface of the light guide body facing the glass pane.

10. The method according to claim 8, wherein the laser welding is carried out at room temperature.

11. The method according to claim 8, wherein in the laser welding, a laser with an output power from 20 W to 1 kW, is used.

12. A method comprising utilising a vehicle window according to claim 1 as a windshield of a vehicle, wherein an optical sensor that is oriented toward the surface of the light guide body facing away from the vehicle window is secured to the interior-side surface of the glass pane.

13. The vehicle window according to claim 3, wherein the light guide body contains soda lime glass.

14. The vehicle window according to claim 5, wherein the wedge angle of the light guide body is at least 10°.

15. The method according to claim 11, wherein the output power is from 50 W to 500 W.

16. The method according to claim 12, wherein the vehicle is a motor vehicle.

* * * * *